United States Patent [19]

Stievenart et al.

[11] 4,338,522
[45] Jul. 6, 1982

[54] DEVICE FOR UNLOADING RADIOGRAPHIC CASSETTES IN DAYLIGHT

[75] Inventors: Emile F. Stievenart, Hoboken; Hendrik S. Plessers, Wychmaal; Julianus J. Hellemans, Kontich; Georges J. Neujens, Merksem, all of Belgium

[73] Assignee: Agfa-Gevaert N.V., Mortsel, Belgium

[21] Appl. No.: 134,552

[22] Filed: Mar. 27, 1980

[30] Foreign Application Priority Data

Mar. 30, 1979 [GB] United Kingdom ............... 7911117

[51] Int. Cl.³ .................... G11B 1/00; G65H 5/22
[52] U.S. Cl. ................................. 250/468; 250/470; 271/3.1
[58] Field of Search ............... 250/468, 470, 521; 271/3.1

[56] References Cited

U.S. PATENT DOCUMENTS

| 3,682,473 | 8/1972 | Kuyt | 271/3.1 |
|---|---|---|---|
| 3,828,195 | 8/1974 | Snarr | 250/468 |
| 3,937,455 | 2/1976 | Hauser | 271/122 |
| 3,968,365 | 7/1976 | Sohngen | 250/468 |
| 4,245,835 | 1/1981 | Turner | 271/226 |
| 4,282,439 | 8/1981 | Matsuura | 250/468 |

FOREIGN PATENT DOCUMENTS

| 2714725 | 10/1978 | Fed. Rep. of Germany | 250/468 |
|---|---|---|---|
| 1501116 | 2/1978 | United Kingdom . | |

Primary Examiner—Alfred E. Smith
Assistant Examiner—Carolyn E. Fields
Attorney, Agent, or Firm—William J. Daniel

[57] ABSTRACT

Daylight radiographic cassette unloader for rapid sequential unloading of cassettes. The device includes an intermediate storage magazine to which the films after removal from the cassettes are fed one by one at a high speed whereinafter they are individually dispensed towards a processing apparatus at a speed equal to that of the processing apparatus. The cassette-unloading time is substantially reduced, while the unloading capacity of the device is tripled compared with prior art machines. Operations may be automatic under the control of a microprocessor.

11 Claims, 9 Drawing Figures

DEVICE FOR UNLOADING RADIOGRAPHIC CASSETTES IN DAYLIGHT

This invention relates to a daylight cassette unloading and radiographic film dispensing apparatus of a kind comprising a light-tight cassette unloading chamber in communication with an entry opening of a light-tight radiographic film storage chamber from which exposed film sheets accumulated therein as a stack can be supplied to a film processor for development of the latent radiographic images, said apparatus comprising means for locating a loaded cassette in a predetermined unloading position in said unloading chamber, means for automatically opening a cassette in the said chamber, and means for transferring a film sheet from the open cassette into said film storage chamber via said entry opening.

Apparatus of that kind are used in medical radiography units and departments. Such apparatus afford the advantages that the unloading of cassettes is achieved automatically and can take place in workrooms under daylight or normal indoor artificial lighting conditions. When a stack of exposed film sheets has accumulated in the storage chamber it is transferred to a film processing unit where the films are subjected to development processing.

The transfer of the storage chamber to the processing unit must await the attention of an operator. His time is best utilized if the transfer is delayed until the storage chamber is at least substantially full but, depending on the rate at which loaded cassettes are introduced into the cassette unloading chamber and unloaded, that delay may be very inconvenient to persons waiting to inspect the processed films. This inconvenience is aggravated by the fact that once the storage chamber has been transferred to the film processing unit for development of the films, the order in which they enter the processing stage is the reverse of that in which they entered the storage chamber.

Cassette unloading apparatus is known which directly couples to an automatic film processor. In such unloading apparatus the exposed film sheets leaving the automatically opened cassettes are caused to travel directly to a take-up mechanism of the processor. The aforesaid inconvenience associated with intermediate storage of the exposed film sheets in a storage chamber as above referred to is thereby avoided. However the overall speed and convenience of film handling is not as satisfactory as may be desired because the rate at which the cassette opening and unloading mechanisms operate must necessarily be synchronised with the speed of film take-up by the processor. In practice busy personnel may often be found waiting for the cassette unloader to complete an operating cycle so that the cassette in the unloading chamber can be removed and a fresh loaded cassette inserted in its place.

It is an object of the present invention to provide a daylight unloading and radiographic film dispensing apparatus which has a receptive chamber for storage of the dispensed film sheets preparatory to development processing, but which enables transfer of the sheets to a processor to take place more conveniently and quickly than the known apparatus of that kind.

A further object of the invention is to provide an apparatus of the kind referred to, which permits "continuous flow" handling of exposed radiographic film sheets from their cassettes to a film processor without need for the cassette handling speed to be restricted to the film take-up speed of the processor.

According to the present invention, there is provided a daylight cassette unloading and radiographic film dispensing apparatus comprising a light-tight cassette unloading chamber in communication with an entry opening of a light-tight radiographic film storage chamber from which exposed film sheets accumulated therein as a stack can be supplied to a film processor for development of the latent radiographic images, said apparatus comprising means for locating a loaded cassette in a predetermined unloading position in said unloading chamber, and mechanisms for automatically opening such cassette in the said chamber and transferring a film sheet from the open cassette into said film storage chamber via said entry opening, characterised in that the storage chamber has a film exit opening which can be placed in light-tight communication with the entrance to a film processor, and a dispensing mechanism which operates, independently of said transfer mechanism, to dispense film sheets from said storage chamber via said exit opening one by one from a said stack and in the order in which they are received from said cassette unloading chamber.

This apparatus affords a combination of advantages. The apparatus can be connected to an automatic film processor so that film handling proceeds from the cassette unloading stage to the processing stage without need for intervention of an operator. Due to the presence of the storage chamber the unloading of a cassette can proceed independently of the take up of film sheets by the processor. If the film sheet take-up mechanism of the processor is interrupted for one reason or another, cassettes can continue to be unloaded, provided that the dispensing mechanism associated with the storage chamber is switched off.

It is not essential, although it is much preferred, for the apparatus to be connected to a film sheet processor while in use.

The apparatus may be constructed so that the storage chamber together with the associated dispensing mechanism can be removed from the cassette unloading chamber and fitted to a processor located at another place.

In any case, when the dispensing mechanism is operated, the film sheets are dispensed in the order in which they were fed into the storage chamber, so that the films are processed in proper sequence.

The invention affords an additional important advantage in that the independence of the cassette unloading and film sheet dispensing functions can be exploited by arranging the film sheet transfer mechanism to effect high speed transfer of a film from the open cassette into the storage chamber. Preferably such transfer mechanism effects such transfer in a period of time corresponding to an average film sheet speed of at least 10 cm per second. This speed is appreciably higher than the speed of travel of film sheets through modern automatic radiographic film processors.

The cassette unloading chamber must have at its entrance a light-screen which can be opened and closed. There must likewise be a displaceable light-tight partition between that chamber and the storage chamber which automatically closes behind each film sheet transferred into the storage chamber so as to prevent light from entering the storage chamber when the entrance screen of the cassette unloading chamber is opened to permit removal of the unloaded cassette. These features are known per se in relation to apparatus combining a cassette unloader and film sheet storage chamber.

Apparatus according to the present invention is preferably constructed so that the unloading period (being the period of time between the moment of commencement of the cycle of the cassette opening mechanism and the moment, following unloading of the cassette and closure of the light-screening partition between the unloading and storage chambers, when it first becomes possible for the unloaded cassette to leave the unloading chamber) is not more than 3 to 5 seconds. That is appreciably less than the corresponding waiting period involved with known apparatus.

The attainment of fast cassette handling speeds is in certain embodiments of the invention promoted by providing an automatic cassette feeder, e.g., an endless belt or roller conveyor, for transporting a cassette into the unloading chamber up to the predetermined unloading position. A detector device or devices, e.g. one or more photocells or microswitches, may be incorporated in the apparatus to emit a signal when a cassette has been inserted in the entrance of the cassette unloading chamber. Such signal can be used to actuate the endless belt or other cassette feeder.

Preferably the cassette unloading chamber has at its entrance a light-screen which is normally open and has an automatic closure mechanism which is triggered by arrival of a cassette at the predetermined unloading position in such chamber.

The mechanisms for automatically opening cassettes in the unloading chamber and for transferring film sheets into the storage chamber can be of constructions known per se. The automatic opening mechanism must of course be constructed to suit the type of cassettes to be handled. Some known cassettes comprising hinged bottom and lid sections have locking catches releasable by local pressure exerted by a manually, mechanically or electromechanically controlled pin. Other cassettes have catches releasable by pivotal movement of a release arm projecting from a side of the cassette. For handling such cassettes the opening mechanism may include a suitable displaceable pin or a finger for displacing a said release arm, as the case may be. Certain of the known mechanisms for transferring film sheets from open radiographic film cassettes include a sheet holder of suction type mounted on an arm which is displaceable towards and away from the film sheet and is associated with a vacuum line for exerting suction via such holder at the appropriate moment in the cycle of the arm, and film sheet transporting rollers which take up the film sheet by its leading edge from the suction holder and propel the film sheet away from the open cassette. The latter type of transfer mechanism is very suitable for use in an apparatus according to the invention.

The invention includes apparatus as hereinbefore defined in combination with a film sheet processor located to receive film sheets dispensed from the storage chamber. Preferably the dispensing mechanism is actuatable responsive to a signal indicative of the readiness of the processor to receive a further sheet for processing. Preferably the film sheet transfer mechanism effects transfer of a film sheet from the unloading chamber into the storage chamber at an average speed which is in excess of the speed of movement of film sheets through the processor.

Certain embodiments of the invention, selected by way of example, will now be described with reference to the accompanying diagrammatic drawings, in which.

Figure 1:
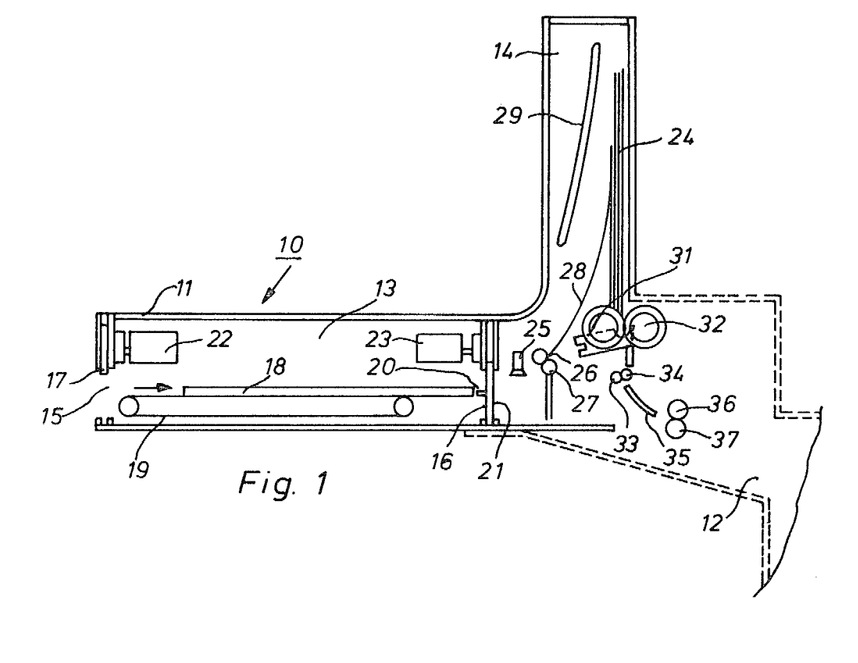
FIG. 1 is a longitudinal cross-sectional view of an unloader for radiographic cassettes according to the invention.

As may be seen from FIG. 1, an unloader 10 for radiographic cassettes comprises a housing 11 which may be light-tightly closed and connected to a radiographic processing apparatus 12 (shown partially in dotted lines).

The housing 11 consists of two main chambers: a chamber 13 in which the radiographic cassette is positioned and unloaded, and a chamber 14 in which the radiographic film or films are temporarily stored prior to dispensing into the processing apparatus 12.

Chamber 13 of housing 11 is built-up as a box-shaped space which has an entrance opening 15 and an exit opening 16 which openings may be screened off and/or unscreened by a so-called light-trap.

The light trap 17 associated with the entrance opening 15 is normally in open position and is only closed during the unloading cycle so that the introduction of a radiographic cassette 18 via such opening 15 and its placing on endless belt 19 may be carried out when desired.

The introduction of the radiographic cassette 18 is detected, as will be more fully explained, by suitable detecting means, such as a small incandescent lamp and a photo-responsive switching device (both not shown in FIG. 1), which causes the endless belt 19 to start moving in the direction of the arrow, thereby taking along the radiographic cassette 18.

After a small time-lapse, the leading edge of the radiographic cassette 18 abuts against the contact arm of microswitch 20 causing the stopping of the endless belt 19, the screening of entrance opening 15 by light trap 17 and the consequent aligning, unlocking and opening of the radiographic cassette 18 (see further). Patent application Ser. No. 134554 filed Mar. 27, 1980 by Agfa-Gevaert N.V. for "Device for positioning radiographic cassettes", is related to an alignment mechanism of the type applied in the present specification.

At the same time exit opening 16 may be brought in its uncovered position by withdrawal of light trap 21.

The closing of entrance opening 15 by light trap 17 occurs via the intermediary of electric motor 22 which by means known in the art imparts a downward movement to light trap 17.

Analogously, the uncovering of exit opening 16 by light trap 21 is carried out by actuation of motor 23.

It will be clear that a small time-lapse has to be taken into consideration between the closing of entrance opening 15 and the uncovering of exit opening 16, otherwise ambient light would be allowed to penetrate into storage part 14 of the device 10.

Indeed, in chamber 14, which serves as a storage magazine, exposed but unprocessed radiographic films 24 are temporarily stored and their exposure to ambient light conditions should be completely excluded. After the radiographic cassette 18 is correctly opened and the exit opening 16 is freed, a film holding device, such as a sucker cup 25, or a plurality of such sucker cups is brought into operative position, so that it can take hold of a small area (or areas) in close vicinity to the edge of the radiographic film. The film holding device is subjected to a cycle of movements, enabling a gradual lifting of the radiographic film so that the latter undergoes at most only slightly friction on the bottom of the radiographic cassette 18. The leading edge of the radiographic film is then seized by transport roller pair 26, 27.

Transport roller pair 26,27 rotates at high speed, so that a radiographic film 28 is projected into storage chamber 14 against the stack 24 of radiographic films which were already present in said part. In order to correct any misalignment of the radiographic film 28, a supplementary guide member 29 may be provided.

The stack 24 of stored radiographic films is situated with its downmost side resting upon pairs of rollers 31 and 32, equidistantly distributed along the lower side of the stack 24 and placed at such a distance of each other that the smallest size of radiographic film is supported by at least two of such roller pairs 31,32. The set of pairs of friction rollers 31,32 seize the leading edge of the radiographic film lying at the right side of the stack thereby retaining the residual films supported by the hooks 30. In so doing only one sheet is guided by roller pair 33,34 and guide 35 towards the inlet roller pair 36,37 of the processing machine 12. The sheet dispensing mechanism will be detailed in the further course of the description.

The roller pair 26,27 rotates at a peripheral speed which is substantially higher than the linear speed imparted to the radiographic film at the entrance and through the processing apparatus. Preferably, said speed attains 250 mm/s, so that the unloading cycle of the unloader 10 according to the invention may be drastically increased.

Once the unloading cycle has come to an end, that is to say, when the radiographic film 28 has completely disappeared into the storage chamber 14, the light trap 21 at the exit opening 16 is brought again in screening position, whereas light trap 17 is withdrawn from entrance opening 15. The mechanism for opening the radiographic cassette 18 is energized so that the radiographic cassette is closed but not relocked. Subsequently, the endless belt 19 starts moving in the opposite direction and stops when the radiographic cassette 18 partly projects out of the entrance opening 15, so that it can be removed by the operator. As the cassette has not been relocked, it is ready to be placed into a so-called daylight loader in order to receive a fresh radiographic film.

The unloader according to the invention is supplementarily equipped with control circuits to increase its convenience still more. So, for example, when the radiographic cassette 18 is put into the apparatus in a incorrect manner (in upside down direction, locking mechanism at the reverse side of the apparatus, etc.) an acoustic alarm may be energized, meanwhile transporting the cassette out of the apparatus. The detection of any incorrect positioning may be carried out very quickly and the time elapsing between the introduction of an incorrectly positioned cassette and its withdrawal amounts to three seconds only.

Another control circuit may be provided in order to bring the radiographic cassette out of the apparatus in case the cassette is empty. In the latter case, the sucker cups 25 would adhere to the intensifying screen provided in the bottom frame of the radiographic cassette 18 and would remain stuck thereto. In order to obviate this effect, use may be had of vacuum sensitive switches mounted in the vacuum line(s) leading to the sucker cups 25 so that the vacuum can be cut-off when the latter has reached a certain minimum value.

The loading device 10, according to the invention is preferably controlled by a microprocessor which has the capacity to build up an adequate logic in order to provide for a highly reliable and ergonomic operation of the device.

Dependent on the place where the unloading device according to the invention will be mounted, the housing 11 may be manufactured from an X-ray impervious material to prevent stray exposure or from a low density material when the radiographic processor is located far enough from the X-ray department.

The storage chamber 14 may be made detachable from the rest of the unloader 10, so that it may be used as a kind of intermediate storage magazine, can moreover be removed from the processing apparatus should anything go wrong in the subsequent processing cycle. The latter characteristic may be combined with the provision of a mechanism making the rollers 31, 32, 33 and 34 rotate in a sense so as to reverse the direction of feed of the radiographic film in the course of being dispensed so that the latter is again collected in the storage chamber 14 of the unloader 10, before the same is removed.

Figure 2:
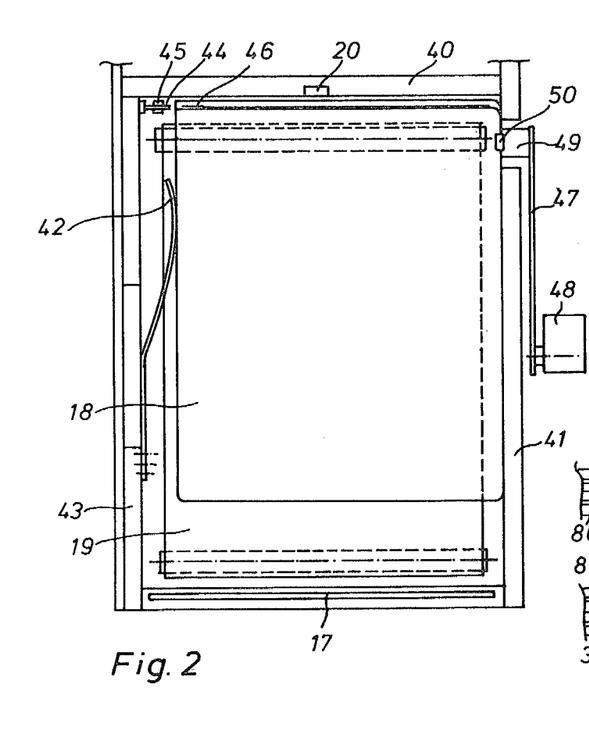
FIG. 2 shows the position of the radiographic cassette in the unloader.

FIG. 2 shows the position into which a radiographic cassette 18 is brought prior to the unloading stage. The mechanism for positioning the radiographic cassette enables radiographic cassettes of every size whether introduced in straight or skewed orientation in the unloading device, to be correctly registered relative to the unlocking and opening mechanism and the film gripping means.

The radiographic cassette 18 is placed on endless belt 19, which starts moving in the direction of the arrow (in FIG. 1). The endless belt 19 stops when the leading edge of the radiographic cassette 18 abuts against the contact arm of microswitch 20. It will be clear that at that moment the leading edge of the radiographic cassette 18 is aligned with abutment member 40 and that the introduction of a radiographic cassette 18 in a skewed position is automatically corrected due to the continuous travelling movement of endless belt 19.

When the arm of microswitch 20 is tripped, the motor (not shown) for driving endless belt 19 is stopped, while motor 22 (see FIG. 1) for closing light trap 17 is energized so that the radiographic cassette 18 is enclosed in a light-tight environment. A small time-lapse after light trap 17 is closed, light trap 21 is opened due to the energizing of motor 23 (see again FIG. 1).

Although radiographic cassette 18 is stopped against abutment member 40 it is not necessarily fixedly located and consequently it may possibly still undergo lateral displacements.

In order to completely immobilize the radiographic cassette 18, it is subsequently displaced to the right in order to abut against side wall 41.

The force needed to push the radiographic cassette against side wall 41 is delivered by spring member 42 which is fitted to side wall 43 by means of rivets or screws.

Figure 4:
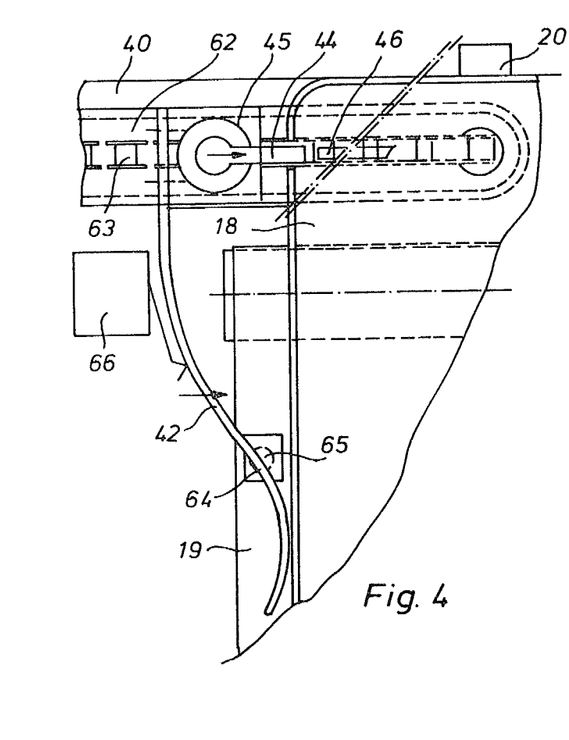
FIG. 4 shows the registering of the radiographic cassette in the unloader.

In the meantime pin 44 carried on a seat 45 is moved in the direction of side wall 41. Details about this mechanism are illustrated in FIG. 4 and described hereinafter.

Pin 44 serves two purposes, namely to aid spring member 42 in pushing radiographic cassette 18 to the right and subsequently to unlock the locking/unlocking mechanism 46 of radiographic cassette 18. The second purpose of pin 44 may be irrelevant, however, when radiographic cassettes with alternative locking/unlocking means have to be handled. The locking/unlocking mechanism forms no part of the invention and will only be considered as an example, not limiting the scope of the invention.

When pin 44 is advanced over a sufficient distance to unlock the radiographic cassette 18 it is kept immobilized, thereby exerting a continuously pushing force on the bottom of radiographic cassette 18, the cover of which is lifted by means of an adequate cover lifting mechanism. In the example as illustrated, the lifting mechanism comprises a lever 47 which may be partly rotated via the intermediary of motor 48. At the extremity of lever 47 a member 49 is provided which is capable to slide under the finger lift projection 50 fixedly secured to the cover of the radiographic cassette 18.

The motor 48 is energized as soon as the radiographic cassette 18 is in its stabilized position. This causes a displacement of lever 47 over, say 30 degrees, so that the cover is lifted and provides sufficient opening in order to permit the sucker cups 25 (in FIG. 1) to enter the cassette and grip the film.

As the entire mechanism for opening the radiographic cassette 18, described hereinbefore, is located in a light-tight housing, light is prevented to enter the space or spaces where the unloading cycle occurs.

It will also be clear to one skilled in the art that in case radiographic cassettes have to be opened which have no finger lift projection 50 at their cover, alternative opening methods may be devised. Alternative methods may make use of sucker cups, for example, which take hold of the cover and which subsequently undergo a lifting, thereby opening the cassette in question.

Figure 3:
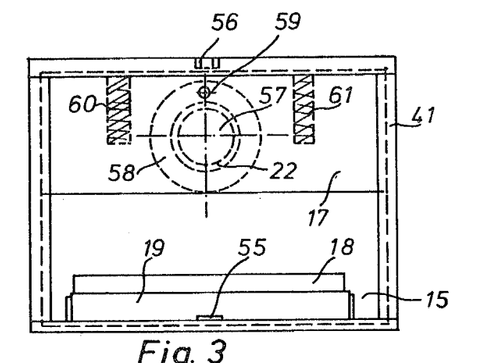
FIG. 3 illustrates the entrance opening of the unloader according to the invention.

FIG. 3 shows a view of the interior of chamber 13 from the entry end of the housing 11. More particularly, it shows the light trap 17, how it is operated and the cassette detecting means.

The cassette detecting means comprise a small incandescent lamp 55, associated with a photoresponsive device 56 such as a photoresistor, a photocell, a phototransistor, or any other electronic component changing one of its characteristics as a function of the amount of light impinging upon it. As a consequence of the introduction of the radiographic cassette 18 in the housing 11 via entrance opening 15 the interruption of the light beam from the light source 55 causes the photoresponsive device 56 to energize a relay (not shown) through which the motor driving endless belt 19 starts rotating.

The abutment of the leading edge of the radiographic cassette 18 against microswitch 20 (see FIGS. 1 and 2) results in the energizing of motor 22, arranged for closing the normally open light trap 17. The closing of light trap 17 may be carried out as follows: on the shaft 57 of motor 22, a disc 58 is provided which is provided with a groove (not shown) in the form of a spiral. A small spindle 59 on light trap 17 is engaged in that groove and pushes the trap in a downward direction as the groove rotates. Rotation of the disc over 180° (as illustrated) causes light trap 17 to descend over a distance corresponding to about half the diameter of the disc 58. This descending movement has to correspond with the distance over which the light trap 17 need to be lowered in order to guarantee a perfect screening off of the interior of part 13 from ambient light. It will be clear that, when the unloading cycle has come to an end and the light trap 17 has to be re-opened to eject the radiographic cassette 18, the disc 58 has to undergo a reverse rotation so that the entrance opening 15 is open again. In order to assist either the downward or the upward movement of light trap 17, a pair of springs 60,61 may be provided which promote either the closing or opening of light trap 17. It is self-evident that alternative mechanisms for opening and closing the light trap 17 (such as a rack and pinion drive) may be devised without departing from the scope of the invention. The light trap 21 is opened and closed in an analogous way.

FIG. 4 is a more detailed view of a cassette unlocking and positioning mechanism. The components which were already illustrated in FIG. 2 are designated by the same reference numerals.

As will be realized, the main difference between the mechanism of FIG. 4 and the one illustrated in FIG. 2 resides in the fact that the seat 45 not only carries the pin 44 for unlocking and pushing the radiographic cassette 18 in the sense indicated by the arrow, but is responsible meanwhile for the support of spring member 42. As a consequence the strain to which said spring member is subjected, especially in the case the large sizes of radiographic cassettes are to be handled, is less than in the embodiment illustrated in FIG. 2.

The seat 45 for pin 44 is slidably mounted in a recess 62 provided in abutment member 40 and the sliding force is provided by a motor (not shown) to which a chain 63 is connected. The depth of the recess 62 is preferably so chosen that the top plane of seat 45 lies flush with the upper face of abutment member 40.

In order to facilitate the displacement of spring member 42, over the still running endless belt 19, it is supplementarily carries a small support 64 in which a small ball 65 or another friction reducing element or material is provided.

The positive displacement of spring member 42 may be used to start another operational step in the apparatus (for example opening of light trap 21 of FIG. 1) or to actuate some means for informing the operator visually or audibly about the continuity of the unloading cycle. Therefore, a microswitch 66 may be provided, the tripping of contact arm of which controls the energizing of one or other signalling means or process-controlling relay or switch.

Figure 5:
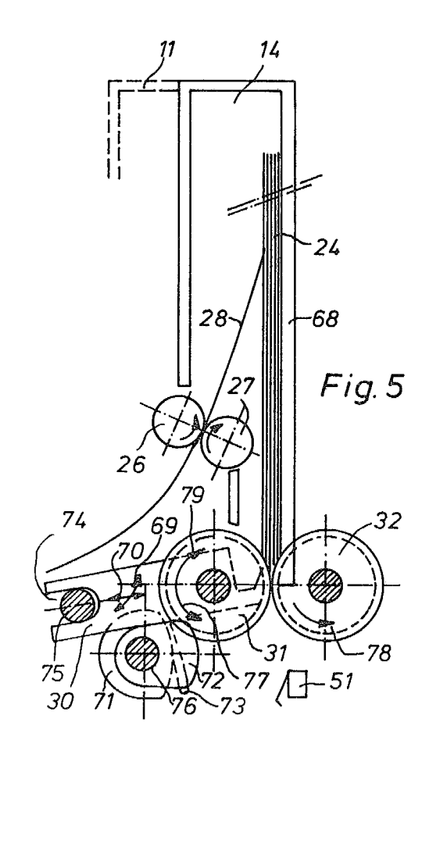
FIG. 5 illustrates the use of the intermediate storage and dispensing station.

FIG. 5 shows in more detail the sheet dispensing mechanism for sequentially feeding radiographic films to the processing machine. The dispensing mechanism serves for dispensing the previously unloaded radiographic films 24 into a processing apparatus (not shown) at the speed of the latter. As the unloading cycle itself occurs at a speed which is substantially higher than that of a processing apparatus a kind of accumulator has to be provided which is capable of temporarily storing said radiographic films 24 in order to secure the right relation between the rates at which the radiographic films are fed towards and dispensed from said accumulating device.

As may be seen from FIG. 5, the radiographic film 28 transported at high speed by rollers 26,27 is projected against the stack 24 of films which were previously unloaded. After leaving the rollers 26,27 the film 28 becomes located on one side of the film stack 24, the back side of which is supported by wall 68. The lower side of the film stack 24 rests against the peripheral surface of rollers 31,32. A set of such rollers is provided in the form of an axially extending row. They are so arranged that at least two roller pairs are available to support a stack of the smallest width of radiographic films 24. Once the selecting cycle is started and the rollers 31 and 32 rotate in opposite directions as indicated by arrows 77 and 78, the lower side of the stack 24 is shifted so that the lower edge of the sheet lying against wall 68 slides into the nip of rollers 31 and 32, so that the sheet which was first introduced is also the first one to be dispensed. If there are no sheets in stack 24 or when the stack has been completely dispensed, the axial arrays of the sets of rollers 31 and 32 is rotated in the direction indicated by the arrows 78 and 79. This sense of rotation corresponds with the transport direction of a radiographic film sheet during the dispensing cycle. When no other films are present and in order to not delay the unloading cycle, there is no need for temporarily storing a radiographic film sheet in storage part 14.

Roller 32 is either covered on its peripheral surface with a layer or composed entirely of a material which has a higher coefficient of friction relative to the surface of radiographic films than does have the surface layer or the composite material of roller 31. As a consequence of this frictional relationship and of the staggered piling of the radiographic films in stack 24, the innermost film resting against wall 68 is carried along by roller 32 whereas the remainder of the films in stack 24 are exposed to an opposed force. In order to guarantee the alignment of the remainder of film stack 24 and the positive separation of the sheets thereof in the course of being dispensed, the hooks 30 are forced to undergo a combined movement according to the arrows 69,70 so that their leading edge is able to slightly displace the leading edge of the innermost film to be dispensed and to intercept the residual sheets of the stack 24.

The remainder of the stack, as a consequence of the motion of the hooks 30 is positively separated from the sheet in the innermost course of being dispensed. When the leading edge of the separated sheet trips the contact arm of a microswitch 51, located under rollers 31,32, or is detected in an other way, such as by means of an optical sensor, the direction of rotation of roller 31 is reversed so that the sheet becomes driven by the combined effect of both rollers 31 and 32. When the sheet has left the storage chamber 14, hooks 30 are returned to their initial position again so that the lower edge of stack 24 rests again against the peripheral surface of rollers 31 and 32, which in the meantime again rotate (governed by the closing or opening again of microswitch 51) in the proper directions for the next innermost radiographic film sheet resting against wall 68 so that another dispensing cycle may be carried out.

Figure 7:
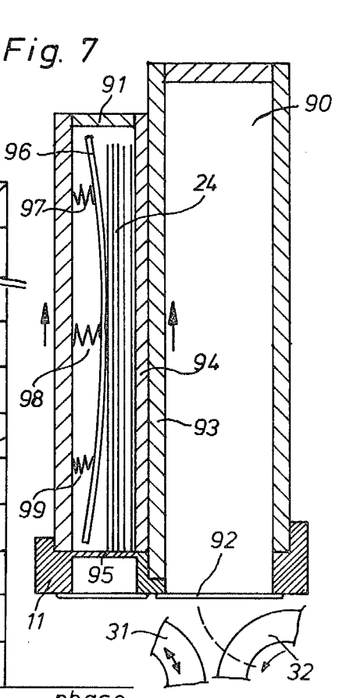
FIG. 7 shows a dual embodiment of the device of FIG. 5.

In a preferred embodiment, the supports of rollers 31 and 32 may be so designed that once a sheet in the course of being dispensed is sufficiently freed from the stack 24, the supports perform a movement so as to open the nip between the rollers 31,32 (as illustrated in FIG. 7) so that the dispensed sheet can freely drop down to be transported to a station for further treatment.

The movement of the hooks 30 is controlled by a pair of cams 71,72 which are rotatably mounted on a shaft 76. The hooks 30 rest freely on cam 72 so that upon rotation of the latter an oscillating movement can be transmitted to the hooks 30. Simultaneously therewith cam 71, via the intermediary of projection 73 delivers a longitudinal displacement to the hooks 30. In order to permit the simultaneous oscillation and longitudinal displacement, a longitudinally extending recess 74 is provided at the non gripping end of the hooks 30. A support 75 is mounted within the recess 74 so that the combined motion of the hooks 30 may be realized without complication.

Figure 6:
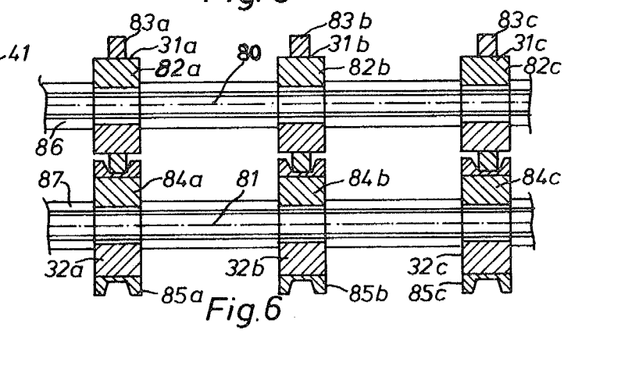
FIG. 6 shows a detail of the device of FIG. 5.

FIG. 6 shows in greater detail a preferred structure for the rollers 31 and 32. In the illustrated embodiment only three pairs of rollers, 31a–32a, 31b–32b, 31c–32c are provided although this number of rollers is not limited and more roller pairs may be provided, if desired. Rollers 31a, 31b, 31c are mounted on shaft 80 and rollers 32a, 32b, 32c on shaft 81.

Rollers 31 comprise a core 82a, 82b or 82c onto which respectively rings 83a, 83b and 83c are fitted, that are made of a hard material which is not liable to deformation and which has a low frictional coefficient versus the radiographic film surface.

On the contrary, rollers 32 comprise a core 84 onto which a layer of a highly deformable material 85 is provided which shows a high frictional coefficient versus the radiographic film surface. In a preferred embodiment said material is silicone rubber.

The periphery of the rings 83a, 83b and 83c shows a protruding profile, whereas the layers 85a, 85b and 85c are recessed to form a ring-like groove to match the protruding rings 83a, 83b and 83c respectively.

The rollers 31 and 32 are fixedly secured to shafts 80 respectively 81 by means of bushings 86 respectively 87, the length of which determining the axial distance between the rollers 31 respectively 32.

From the illustrated embodiment, it may be derived that the rollers and bushings are threadably secured to the shafts 80 and 81. It will be clear, however, that alternative techniques, such as glueing, may be applied.

In modern clinical techniques, it may happen that a series of radiographic exposures are made, such as in the case of angiography. In that case it may be of advantage to unload radiographic cassettes into a so-called intermediate unloader which is carried to the processing apparatus for the bulk processing of the contents thereof. An embodiment for carrying out this possibility is illustrated in FIG. 7.

Such a modification is characterized by the fact that instead of one fixed intermediate storage means (as illustrated in FIG. 1) two magazines 90 and 91 are provided. The magazine 90 is removably linked with housing 11 and via a light trap 92 (only schematically represented) connected to the dispensing mechanism from which only rollers 31 and 32 are illustrated.

Magazine 91 is the magazine of the intermediate unloader which may also be located on a seat provided in housing 11 in such a way that wall 93 of magazine 90 and wall 94 of magazine 91 are in intimate contact with each other. Magazine 91 is provided with its own light trap 95 to enable an operator to bring the magazine 91 to another unloader for further processing of the film sheets contained therein. Walls 93 and 94 are mounted for slidable movement (in the sense of the respective arrows) in their respective magazines so that they may be brought from closed into open condition, the spaces occupied by both magazines 90 and 91 mating with each other. In order to guarantee the light-tightness of the device, walls 93,94 are blocked in their upward movement when sufficient space for the films is provided.

The particular feature of magazine 91 is constituted by the provision in its interior of a biasing element for pushing the film stack 24 into the empty magazine 90, for subsequent processing after partial removal of walls 93,94. The biasing element may be in the form of a pusher 96 carried by a plurality of pressure exerting springs 97, 98, 99.

When the film stack 24 is pushed into magazine 90, the walls 93 and 94 are again brought in their original position so that light trap 92 may be opened and the processing of the stacked films 24 may start.

When used as an intermediate unloader, the magazine 91, after being filled with the films is taken of the device and brought to a central processing unit, for example, where the films contained therein can be processed according to the sequence they were stored.

Figure 8:
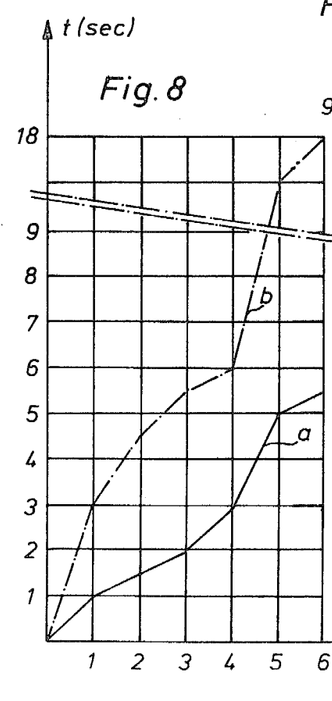
FIG. 8 is a graph illustrating the time necessary to unload a radiographic cassette in an unloader according to the invention and in a prior art unloader.

In FIG. 8 is illustrated, by way of a graph, the time necessary to unload a radiographic film cassette in an unloading device according to the invention compared with the period required when unloading is carried out with prior art apparatus. These times are represented in the drawing in the form of "time lines" a and b corresponding to the inventive device and the prior art structure, respectively, which aggregate the operating times required for the several operative phases of the overall processing cycle, as defined below.

In the abscissa are indicated the phases which constitute the unloading cycle whereas the ordinate is a time scale in seconds.

The phases constituting the unloading cycle are labeled as follows:

| | |
|---|---|
| phase 1: | insertion of the radiographic cassette |
| phase 2: | positioning and unlocking of the radiographic cassette |
| phase 3: | starting of the opening of the cassette |
| phase 4: | taking the sheet of radiographic film |
| phase 5: | feeding the film sheet towards the storage chamber |
| phase 6: | ejecting the cassette. |

As is shown in FIG. 8 a substantial gain of time is realized particularly during phases 4 and 5, so that the unloading capacity of the radiographic unloader according to the invention is practically tripled with respect to prior art apparatus.

Figure 9:
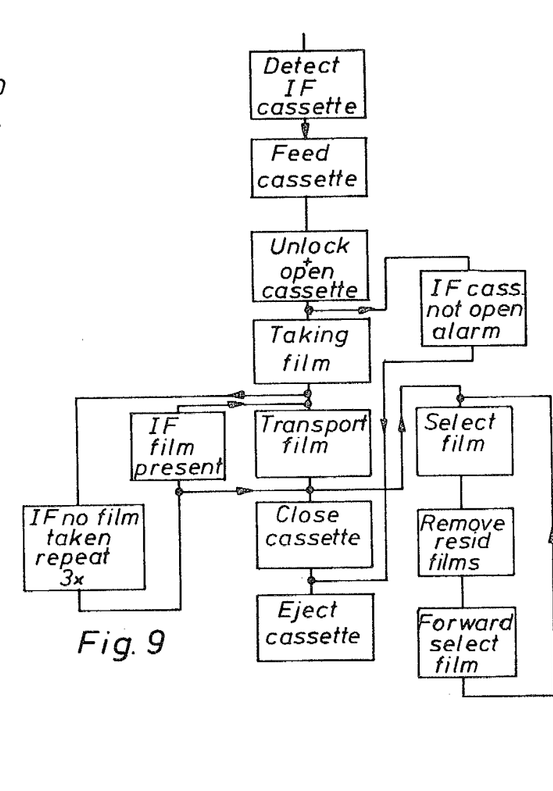
FIG. 9 is a block diagram of the logic in the unloader of FIG. 1.

Finally, in FIG. 9 is illustrated a block diagram of the logic in a daylight radiographic cassette unloader according to the invention and as shown in FIG. 1.

The first action to be carried out during an unloading cycle is the detection of the presence of a radiographic cassette to be unloaded (referred to as "DETECT IF CASSETTE"). The presence or absence of a radiographic film cassette is detected by means of a photoelectric cell and associated source of electromagnetic radiation (either light-emitting or IR-emitting sources and receptors may be used) which span the entrance opening of the device which has to be transversed by the closed radiographic cassette prior to unloading the latter. The detection of the radiographic cassette automatically actuates the start of the transport means (FEED CASSETTE) for transporting the radiographic cassette further into the unloader. After the cassette is sufficiently advanced into the latter, it is automatically positioned whereupon the entrance opening is automatically closed. The feeding cycle also embraces the correct aligning and positioning of the radiographic cassette.

Once the radiographic cassette is positioned in the unloader, the cassette is unlocked and opened (UNLOCK AND OPEN CASSETTE). This step is characterized by the actuation of the lever of levers which normally keep the radiographic cassette closed in order to bring the latter out of mutual engagement and to lift the cover of the cassette by adequate means such as sucker cups, cover engaging and lifting arms, etc.

Thereupon, the film may be taken out of the opened cassette (TAKING FILM) by other appropriate means. In the preferred embodiment, this action is executed with the help of a plurality of sucker cups suspended from a suction pipe which is subjected to a number of motions complementing each other to guarantee a gentle taking of the film without excessive friction of the surface of the latter against the plane area of the cassette bottom or the intensifying screens provided thereon.

After the film is taken out of the cassette, it is transported at high speed (TRANSPORT FILM) to the temporary storage magazine so that after a small time lapse the cassette may be closed again (CLOSE CASSETTE) by reversing the movement of the opening and unlocking means. It will be clear that re-locking of the radiographic cassette is not necessary as a device for loading a radiographic cassette in daylight which nowadays is used in combination with the unloading device according to the invention is adapted to receive already unlocked cassettes for reasons of convenience and gain of time.

After closing the radiographic cassette, the cycle "EJECT CASSETTE" is started, which consists in re-opening the light trap at the entrance opening of the unloader, to reverse the sense of the transport means and to detect the passage of the cassette through the gap between lightsource and photocell mounted at the entrance opening of the unloader so that the transport means are stopped when the cassette emerges out of the entrance opening over a distance of about 5 cm so that it may be easily taken by the operator.

In the foregoing, the logic necessary for the manipulation of a correctly introduced radiographic cassette was described. If, however, due to an inadvertence of the operator, the radiographic cassette was incorrectly introduced (for example turned upside down, or with the locking/unlocking-means located at the trailing edge) use can be made of an alarm circuit. The incorrect introduction of the radiographic cassette is most easily detected by the fact that the latter cannot be opened. When this event is sensed an alarm circuit (IF CASSETTE NOT OPENED-ALARM) is actuated to automatically switch on the logic into the "EJECT CASSETTE" cycle so that the radiographic cassette is ejected three seconds after its introduction. Simultaneously with the ejection of the cassette a visual and/or acoustic alarm signal is displayed and/or generated in order to draw the operator's attention to the fact that something went wrong.

Should it happen that the film taking means which are actuated during the "TAKING FILM" sequence are incapable of gripping a film and in order to be sure that a film is present, but not seized immediately after actuation of the film holding means, the latter action may be repeated three times.

This action is governed by the step "IF NO FILM TAKEN REPEAT 3×". When after three times no film is taken out of the cassette the logic continues with the ejecting of the cassette.

If, however, during one of the three trials the presence of a radiographic film is sensed, the logic "IF FILM PRESENT" continues with the actuation of the transport mechanism for the film.

As amply disclosed in the foregoing description, the film transport mechanism directs the film towards an intermediate storage compartment, where it is either directly fed towards the processing machine when no film is present or is stacked against the previously unloaded films for temporary retention.

The logic process for the film manipulation comprises first the selection of a stacked film according to the "first in, first out" principle. This is governed by the logic "SELECT FILM". Then, the remainder of the stack is positively separated from the selected film by means of the logic "REMOVE RESIDUAL FILMS" whereinafter the logic "FORWARD SELECTED FILM" positively drives the film transport mechanism for feeding the selected films towards the processing machine.

The complete set of steps "SELECT FILM", "REMOVE RESIDUAL FILMS" and "FORWARD SELECTED FILM" is repeated until the intermediate storage magazine is emptied.

The afore-described logic cycle may easily be controlled by a so-called microprocessor which due to the small space required may easily be built-in into the daylight unloading device, thereby substantially increasing the convenience thereof.

We claim:

1. A daylight cassette unloading and radiographic film dispensing apparatus comprising a light-tight cassette unloading chamber, a light-tight film storage chamber having at one side of its lower end an entry opening adapted for communication with said unloading chamber and within which chamber exposed film sheets are accumulated as a stack for delivery one by one to a film processor for development of the latent radiographic images, said storage chamber being arranged in generally vertical orientation to hold the film stack therein in generally upright position and having at the opposite side of its lower end a film exit opening which can be placed in light-tight communication with the entrance to the film processor, means for locating a loaded cassette in a predetermined unloading position in said unloading chamber, mechanisms for automatically opening the thus-positioned cassette in said chamber and transferring a film sheet from the open cassette along a generally arcuate path upwardly through said entry opening into said film storage chamber against one side of said stack therein, and a dispensing mechanism operating independently of said transferring mechanism for dispensing film sheets from the stack in said storage chamber via said exit opening one by one and in the order in which they are received from said cassette unloading chamber, said dispensing mechanism comprising stack retaining means periodically projectable across said storage chamber exit opening for engagement with the lower edges of the sheets in said upright stack and associated sheet withdrawing means operative to engage said lower sheet edges when free of said retaining means for withdrawing from the stack the outermost sheet on the other side from the one side against which newly unloaded film sheets are stacked.

2. Apparatus according to claim 1, wherein the transfer mechanism operates to effect such transfer of a film sheet into the storage chamber in a period of time corresponding to an average film sheet speed of at least 10 cm per second.

3. Apparatus according to claim 1, including a cyclically operating cassette unloading mechanism and wherein the unloading period between the moment of commencement of the cycle of the cassette opening mechanism and the moment, following unloading of the cassette, when it first becomes possible for the unloaded cassette to leave the unloading chamber is not more than 3 to 5 seconds.

4. Apparatus according to claim 1, including an automatic cassette feeder for transporting a cassette into the unloading chamber up to the predetermined unloading position.

5. Apparatus according to claim 4, wherein the said cassette feeder is in the form of an endless belt.

6. Apparatus according to claim 4 and incorporating a detector device which yields a signal when a cassette has been inserted in the entrance of the cassette unloading chamber, which signal brings said cassette feeder into operation.

7. Apparatus according to claim 1, wherein the cassette unloading chamber has an entrance light-screen which is normally open and has an automatic closure mechanism which is triggered by arrival of a cassette at the said predetermined unloading position in said chamber.

8. Apparatus according to claim 1, wherein said film transfer mechanism incorporates a suction gripping means which is displaceable towards and away from the film sheet.

9. Apparatus according to claim 8, wherein said film transfer mechanism includes a suction gripping means for removing each sheet from its cassette and delivering the leading edge of said sheet into the nip of a pair of film sheet transporting rollers which withdraws each film sheet from said suction gripping means and propels the film sheet away from the open cassette.

10. Apparatus according to claim 1, in combination with a film sheet processor located to receive film sheets dispensed from the storage chamber.

11. Apparatus according to claim 10, wherein the film sheet transfer mechanism effects transfer of a film sheet from the unloading chamber into the storage chamber at an average speed which is in excess of the speed of movement of film sheets through the processor.

* * * * *

UNITED STATES PATENT OFFICE
CERTIFICATE OF CORRECTION

Patent No. 4,338,522　　　　　　　　Dated July 6, 1982

Inventor(s)　Emile Frans Stievenart et al

It is certified that error appears in the above-identified patent and that said Letters Patent are hereby corrected as shown below:

In the Claims:

Claim 9, line 1, "8" should read -- 1 --.

Signed and Sealed this

Thirty-first Day of August 1982

[SEAL]

Attest:

GERALD J. MOSSINGHOFF

Attesting Officer　　Commissioner of Patents and Trademarks